Patented May 20, 1941

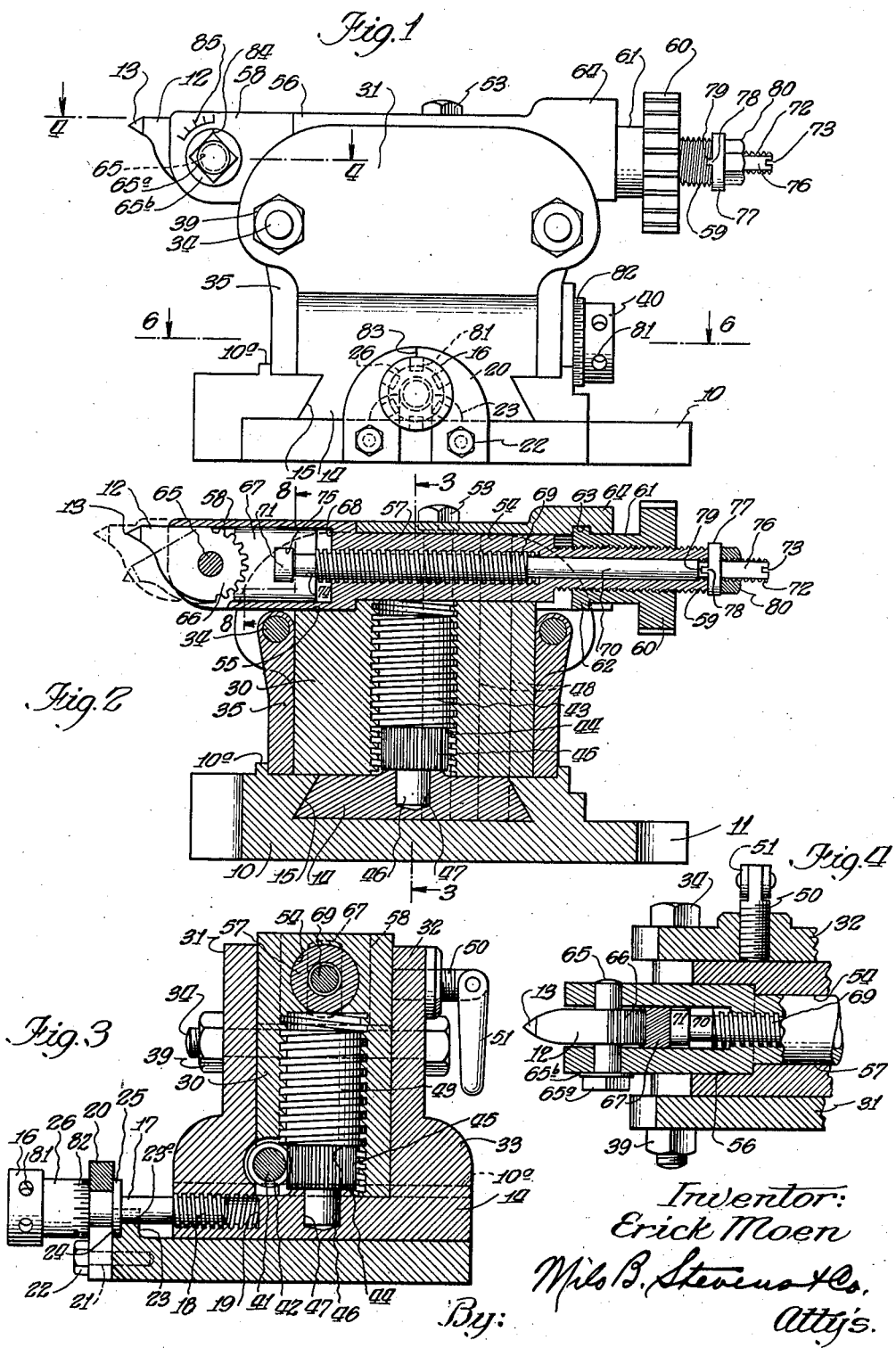

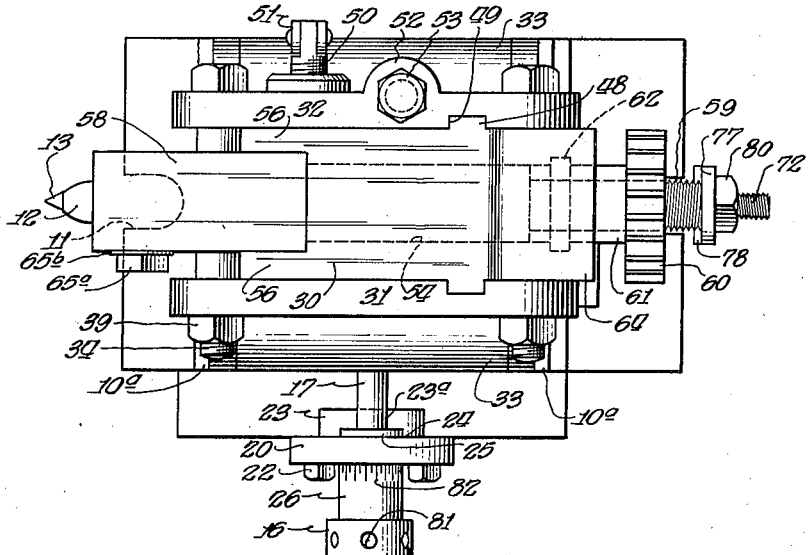
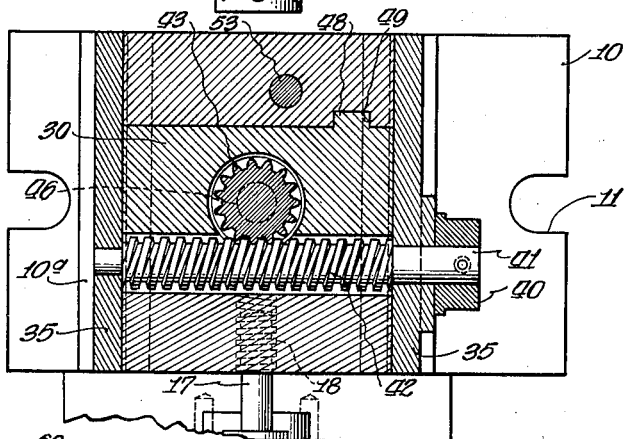
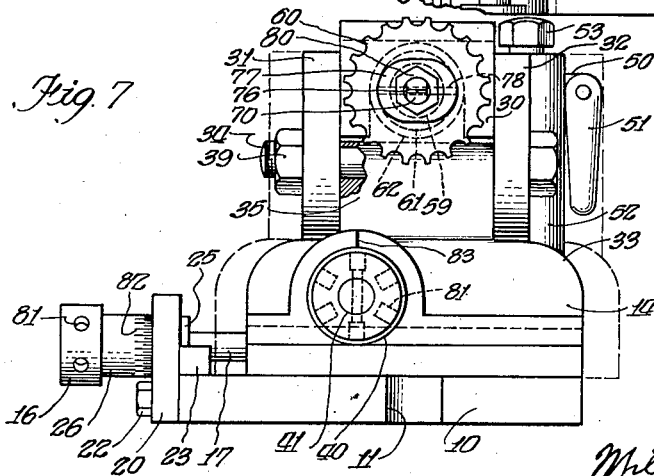
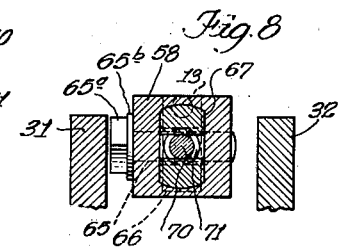

2,242,978

UNITED STATES PATENT OFFICE 2,242,978

TAIL STOCK FOR MILLING MACHINES

Erick Moen, Chicago, Ill.

Application April 13, 1940, Serial No. 329,544

19 Claims. (Cl. 90—23)

My invention relates to tail stocks for milling machines and the like, and more particularly to the means for adjusting the same to the requirements of the work, and my main object is to provide a tail stock which contains all the adjusting means in a single, compact unit.

A further object of the invention is to provide a tail stock which is readily mountable or attachable on the bed of the milling machine and requires no special installing means or conditions.

Another object of the invention is to group the adjusting means for handy access, easy manipulation and without being in the way of each other.

An additional object of the invention is to build the novel tail stock with adjusting means which are rugged in construction, positive in action and simple in design.

With the above objects in view, and any others which may suggest themselves from the description to follow, a better understanding of the invention may be had by reference to the accompanying drawings, in which—

Fig. 1 is a side elevation of the novel tail stock;

Fig. 2 is a longitudinal section;

Fig. 3 is a section on the line 3—3 of Fig. 2;

Fig. 4 is a section on the line 4—4 of Fig. 1;

Fig. 5 is a top plan view;

Fig. 6 is a section on the line 6—6 of Fig. 1;

Fig. 7 is a rear elevation; and

Fig. 8 is a section on the line 8—8 of Fig. 2.

Referring specifically to the drawings, 10 denotes the base of the novel tail stock, the same being formed with notches 11 in the ends for the application of bolts (not shown) to secure the tail stock on the bed of the milling machine.

The center pin of the tail stock is indicated at 12, such pin having the usual point 13 which is applied to the work. It is intended that the center pin be so mounted as to receive adjustment laterally, toward the front or rear, angularly, and vertically. The lateral adjustment of the pin primarily involves a transverse slide 14 which is flush with the upper surface of the base 10 and make a dove-tailed joint in an undercut recess 15 of the same. The slide 14 is moved by the turning of a finger knob 16 which is handily located at one side of the unit, the finger knob being carried by the outer end of a spindle 17. The spindle extends inwardly to be formed into a screw 18 which preferably has a square right-hand thread as shown. The screw 18 is threaded into a tapped cavity 19 made in the side of the slide. Thus, the knob 16 propels the slide laterally in one or the other direction as indicated by dotted lines in Fig. 7.

In order that the screw 18 may not move longitudinally, it is locked to the base by certain means. Thus, the base first receives an arch 20 along one side, this arch having its end portions apertured at 21 for the passage of bolts 22 into the base to secure the arch thereto. Next to the arch the base is built up with a block 23 whose upper surface is gouged opposite the spindles 17 as indicated at 23a to form a pocket for the same; and the outer face of the block is formed with a half round enlargement 24 of the recess 23 to accommodate the lower portion of a collar 25 forming part of the spindle. The spindle knob 16 has a shank 26 which is longitudinally spaced from the collar 25, and the spindle portion in this space receives the recess of the arch, being in this manner locked against longitudinal movement; yet, if the spindle is to be removed for any reason, it is only necessary to remove the bolts 22 and unscrew the spindle until it is free to be withdrawn.

The center pin 12 is disposed in a massive block 30 which is confined between side walls 31 and 32 rising from the slide 14, the slide being rounded at the sides as indicated at 33 to reduce the thickness of the walls. These are secured transversely by cross-bolts 34, which pass through end spacers 35 and receive securing nuts 38. The spacers extend downwardly to be received between end ribs 10a rising from the base 10, so that the spacers are held in place without bolts or other separate securing devices.

The block 30 is slidable between the walls 31 and 32 and the spacers 35 in a vertical course, upwardly from and back to the position shown, and these motions may be induced by the operation of a knob 40 which is located rearwardly of the tail stock. The knob is carried by a spindle 41 which is journaled with one end portion in the rear spacer 35, continuing freely in the form of a left-hand worm-threaded screw 42, and terminating in a journal formed by the frontal spacer 35.

The block 30 has a tapped vertical bore into which a screw 43 is threaded from the bottom. The screw 43 is reduced in diameter for some distance above the bottom of the block as indicated at 44 and formed with a series of longitudinal teeth 45 which clear the threads in the block and mesh with the screw 42. Thus, the rotation of the knob 40 in a clockwise direction as seen in Fig. 7 will turn the screw 43 in a like direction as seen in Fig. 6, this action having the effect of raising the block 30. In order that the screw 43 may be properly centered for the rotary action just described, it is extended downwardly from the center with a pin 46 which is rotatably disposed in a cavity 47 made in the top of the slide 14.

The vertical motion of the block 30 is guided by the slidable seating of side keys 48 of the block in matching grooves 49 in the walls 31 and 32. The block may be locked at any point in its travel by the advance of a set screw 50 threaded into the wall 32 to bear against the corresponding side of the block. The set screw has a swiveled handle 51 which folds close to the tail stock, as shown, when not in use. The said wall 32 is also thickened rearwardly as indicated at 52 to afford sufficient stock for a tapped vertical bore into which is threaded a bolt 53, the latter extending down to the base 10 as indicated by dotted lines in Fig. 2 to fix the slide at any point in its travel.

The block 30 is made with a longitudinal circular bore 54 near the top, this bore opening into a rectangular U-shaped enlargement which is at the front end of the block and has a floor 55 and sides 56. A shaft 57 is slidable in the bore 54 and has a frontal headpiece 58 which is slidable in the enlargement 55—56 from the position in Fig. 2 in the left-hand direction, such as to a position indicated by dotted lines in the same figure. The shaft 57 is reduced to a screw 59 at the rear, which threads through a hand nut or wheel 60. The latter has a forwardly-extending hub 61 terminating with a circular flange 62 which seats in an internal groove 63 made in an arched rearward extension 64 of the block.

According to Fig. 7, the clockwise rotation of the hand nut 60 is calculated to feed the screw 59 in the forward direction, so as to advance the headpiece 58 of the shaft 57. The said headpiece carries the center pin 12, and it follows that the hand nut 60 serves to adjust the position thereof longitudinally.

It is also desirable to adjust the center pin 12 angularly, and for this purpose the same is made with a disk-like base which carries a cross-pin 65 whose projecting portions pass snugly through the sides of the headpiece 58, one of such portions having a square head 65a with a circular base 65b. The pin is therefore rockable from the full-line position in Fig. 2 to a position indicated by dot-and-dash lines in the same figure. The adjustment of the pin is made by the application of a wrench to the head 65a, but a special mechanism is employed to lock the pin in the chosen position.

Fig. 2 shows the back edge of the pin base in the form of a gear 66 which is in mesh with a rack 67 slidable in the headpiece 58. The pin is thus locked in the chosen angular position until a change in the latter is desired, when the rack is retracted in the clearance afforded by the headpiece cavity 68.

The retraction of the rack 67 is effected by a long screw 69 threaded in the shaft 57. The forward portion of the screw shank 70 terminated with a head 71, while the rear portion runs freely through the shaft, being threaded as indicated at 72 from a point shortly before its exit and slotted in the end as shown at 73 for the application of a screw-driver or similar tool. The rear end of the gear rack 67 has a horizontal slot 74 enlarged to form an opening 75 to lodge the head 71 and forepart of the screw shank 70, so that the longitudinal adjustment of the rack is controlled by the rotation of the screw in the corresponding direction. The rear-end slot 73 is not only provided for the application of an ordinary or crank-type of screw-driver to adjust the gear rack 67 forth and back, but also to facilitate the insertion of the screw 69 into the shaft 57. Thus, the assembly of the screw 69 and the rack 67 are inserted into the headpiece 58 from the left, with the screw shank 70 leading into the bore of the shaft 57. A long screw-driver is now inserted into the bore of the shaft from the right to engage the slot 73 and thread the screw 69 into the same.

The position of the rack 67 may be fixed by locking the screw 69 against rotation. Thus, the rear-end portion of the screw is formed flat on opposite sides, as indicated at 76, to slidably receive a ring 77 whose opening is similarly formed. The ring has oppositely located lugs 78 projecting from its forward face, these being adapted to seat in correspondingly-located notches 79 in the rear end of the shaft screw 59. When the parts are so assembled the screw 69 cannot turn relative to the screw 59; and this relation may be fixed by running a nut 80 along the screw 69 until it abuts the ring 77.

The knobs 16 and 40 have circularly-spaced peripheral cavities 81 for the application of a suitable key to turn the knobs with more facility; and the knob shanks are marked with calibrations 82 readable in conjunction with origin marks 83 on the stationary members adjacent to such shanks. Also, the flange 65b of the head 65a bears an origin mark 84 opposite one corner of the head, such origin mark co-operating with a scale 85 on the adjacent face of the headpiece 58 to indicate the angular adjustment of the center pin 12.

It will be evident from the above description that I have provided a tail stock which is a self-contained unit having all facilities for the adjustment of the center pin 12. The lateral, vertical, longitudinal and angular adjustments may be regulated to fine limits by virtue of the screw feeds and the ease of ascertaining the progress thereof. The several adjusting features are compactly and logically grouped to occupy a minimum amount of room, and yet permit the incidental parts to be made sufficiently large to be sturdy and stable. No springs or other delicate parts are employed in the novel tail stock, and the elements composing the same are of a simple nature, easily assembled or taken apart, and in keeping with sound mechanical principles. Altogether, the novel tail stock is an unit which is easy and handy to use and enables adjustments to be determined and made with a high degree of accuracy.

While I have described the improved tail stock along specific lines, various minor changes and refinements may be made without departing from its principle, and I desire to consider all such changes and refinements as coming within the scope and spirit of the appended claims.

I claim:

1. A tail stock for milling machines comprising a base, a slide mounted in the same for transverse movement, means carried by the slide to engage the work, the slide having a tapped transverse bore, a feed screw for the slide threaded into the bore, and means to retain the screw against longitudinal movement, the screw having a spindle externally of the base, a knob at the outer end of the spindle, a collar inwardly spaced from the knob, an arch straddling the spindle portion between the knob and the collar, and means to secure the arch to the base.

2. A tail stock for milling machine comprising a base, a slide mounted in the same for transverse movement, means carried by the slide to engage the work, the slide having a tapped transverse bore, a feed screw for the slide threaded into the bore, and means to retain the screw against longitudinal movement, the screw having a spindle externally of the base, a knob at the outer end of the spindle, a collar inwardly spaced from the knob, an abutment carried by the base inwardly of the collar, an arch straddling the spindle portion between the knob and the collar, and means to secure the arch to the base, the outer face of the abutment being recessed to accommodate the lower portion of the collar, and the top face of the abutment also being recessed to seat the lower portion of the spindle.

3. A tail stock for milling machines comprising a base, a slide mounted in the same for transverse movement, means carried by the slide to engage the work, the slide having a tapped transverse bore, a feed screw for the slide threaded into the bore, and means to retain the screw against longitudinal movement, the screw having a spindle externally of the base, a knob at the outer end of the spindle, a collar inwardly spaced from the knob, an arch straddling the spindle portion between the knob and the collar, and means to secure the arch to the base, the knob having a series of peripheral graduations, and the outer face of the arch having an origin mark for the reading of the graduations when the knob is turned.

4. A tail stock for milling machines comprising a base, a slide laterally movable upon the same, a pair of laterally-spaced walls carried by the slide, a block between the walls and having means to engage the work, other means to move the block vertically between the walls, bolts connecting the walls transversely in the regions of their ends, and transverse members between the walls in such regions to space the walls in relation to the slide.

5. The structure of claim 4, said members being end walls resting on the base.

6. The structure of claim 4, said members being end walls resting on the base, and guards rising from the latter to prevent the outward departure of the end walls.

7. The structure of claim 4, said members being end walls resting on the base, and transverse ribs projecting upwardly from the base along the outer faces of the end walls to prevent the outward departure of the same.

8. The structure of claim 4, said members being perforated for the passage of said bolts.

9. A tail stock for milling machines comprising a base, a slide laterally movable upon the same, a pair of laterally-spaced walls carried by the slide, a block between the walls and having means to engage the work, the block being vertically-tapped from the bottom, a vertical screw threaded into the block, and means to rotate the screw with the effect of raising or lowering the block, the second-mentioned means comprising a series of gear teeth around the lower portion of the screw, and a worm spindle adjoining said portion and in mesh with said gear teeth.

10. In a tail stock for milling machines, a support, a horizontal member longitudinally slidable therein, a center pin carried by the forward end portion of said member, and means to dispose the center pin adjustably between high and low positions, said means comprising a base for the center pin, and a cross-pin carried by the base and journaled horizontally in said member to render the center pin rockable between said positions.

11. In a tail stock for milling machines, a support, a horizontal member longitudinally slidable therein, a center pin carried by the forward end portion of said member, and means to dispose the center pin adjustably between high and low positions, said means comprising a base for the center pin, a cross-pin carried by the base and journaled horizontally in said member to render the center pin rockable between said positions, and means to fix the center pin at any point in its adjustment.

12. In a tail stock for milling machines, a support, a horizontal member longitudinally slidable therein, a center pin carried by the forward end portion of said member, and means to dispose the center pin adjustably between high and low positions, said means comprising a base for the center pin, a cross-pin carried by the base and journaled horizontally in said member to render the center pin rockable between said positions, and means to fix the center pin at any point in its adjustment, such means comprising a geared profile for the rear portion of said base, and a gear-rack slidable longitudinally of the member to engage said profile at any point to which it has been rotated.

13. In a tail stock for milling machines, a support, a horizontal member longitudinally slidable therein, a center pin carried by the forward end portion of said member, means to adjust the center pin for variation between high and low positions, such means including a control slidable longitudinally of the member, a screw threaded in the latter and protruding from its rear end, and an interlocking connection between the forward end of the screw and said control, said connection being effective to slide the control in one or the other direction when the screw is rotated accordingly.

14. In a tail stock for milling machines, a support, a horizontal member longitudinally slidable therein, a center pin carried by the forward end portion of said member, means to adjust the center pin for variation between high and low positions, such means including a control slidable longitudinally of the member, a screw threaded in the latter and protruding from its rear end, an interlocking connection between the forward end of the screw and said control, said connection being effective to slide the control in one or the other direction when the screw is rotated accordingly, and means to lock the screw from rotation relative to said member.

15. In a tail stock for milling machines, a support, a horizontal member longitudinally slidable therein, a center pin carried by the forward end portion of said member, means to adjust the center pin for variation between high and low positions, such means including a control slidable longitudinally of the member, a screw threaded in the latter and protruding from its rear end, an interlocking connection between the forward end of the screw and said control, said connection being effective to slide the control in one or the other direction when the screw is rotated accordingly, and means to lock the screw from rotation relative to said member, the rear end of the member being formed with notches and the screw formed with flattened sides, and said locking means comprising a ring slidable along the flattened portion of the screw and with lugs on the forward end of the ring adapted to fit said notches, the opening in the ring conforming to the flattened cross-section of the screw.

16. In a tail stock for milling machines, a support, a horizontal member longitudinally slidable therein, a center pin carried by the forward end portion of said member, means to adjust the center pin for variation between high and low positions, such means including a control block slidable longitudinally of the member, the control block having an opening in its rear end, such opening having a forward enlargement, a screw threaded in the member, a frontal shank extending from the screw into said opening, and a terminal head for said shank disposed in said enlargement, the shank and head being rotatable in the control block and forming an interlocking connection between the same and the screw to procure the slidable movement of the control block forth or back when the screw is turned accordingly.

17. In a tail stock for milling machines, a support, a horizontal member longitudinally slidable therein, a center pin carried by the forward end portion of said member, a threaded rearward expansion of the member, a hand nut screwed on said extension, and means to rotatably dispose said hand nut in relation to the support while locking the hand nut against longitudinal motion, the rotation of the hand nut serving as a longitudinal feed for the member to advance or retract the center pin in relation to the support.

18. A tail stock for milling machines comprising a base, a slide laterally movable upon the same, a pair of laterally-spaced walls carried by the slide, a block between the walls and having means to engage the work, the block being vertically-tapped from the bottom in a substantially central zone, a vertical feed screw threaded into the block, and means to rotate the screw with the effect of raising or lowering the block.

19. In a tail stock for milling machines, a support, a horizontal member longitudinally slidable therein, a center pin carried by the forward end portion of said member, and a horizontal rocker bearing for the center pin in said member to render the center pin adjustable between high and low positions.

ERICK MOEN.